United States Patent [19]
Holcombe

[11] Patent Number: 5,125,026
[45] Date of Patent: Jun. 23, 1992

[54] INTERNAL TELEPHONE INTERCOM SYSTEM

[75] Inventor: Wayne T. Holcombe, Palo Alto, Calif.

[73] Assignee: H & K Devices, Inc., Mountain View, Calif.

[21] Appl. No.: 725,876

[22] Filed: Jun. 28, 1991

Related U.S. Application Data

[63] Continuation of Ser. No. 455,602, Dec. 21, 1989, abandoned.

[51] Int. Cl.⁵ .................. H04M 1/60; H04M 9/00; H04M 1/00
[52] U.S. Cl. .................................... 379/167; 379/64; 379/66; 379/171; 379/387
[58] Field of Search .................. 329/56, 59, 64, 66, 329/94, 101, 102, 103, 109, 158, 159, 167, 171, 172, 173, 176, 374, 387, 389

[56] References Cited

U.S. PATENT DOCUMENTS

| | | | |
|---|---|---|---|
| 2,323,033 | 6/1943 | Hagen | 379/64 |
| 3,743,791 | 7/1973 | Duff et al. | 379/171 |
| 4,380,687 | 4/1983 | Stewart | 379/64 |
| 4,408,102 | 10/1983 | Lumpkin | 379/101 |
| 4,523,307 | 6/1985 | Brown et al. | 379/66 |
| 4,730,306 | 3/1988 | Uchida | 379/202 |
| 4,734,932 | 3/1988 | Lott | 379/64 |
| 4,891,605 | 1/1990 | Tirkel | 381/94 |
| 4,908,855 | 3/1990 | Ohga et al. | 379/387 |

*Primary Examiner*—James L. Dwyer
*Assistant Examiner*—William Cumming
*Attorney, Agent, or Firm*—Thomas E. Schatzel

[57] ABSTRACT

An internal telephone intercom system including means for connecting to a dedicated telephone communication line, a plurality of telephone sets connected to the line and adapted for telephone communications with locations external to said dedicated line, an audio receiving means at each telephone set for receiving audio signals from a microphone within said telephone set, a radio frequency generator means for generating a carrier frequency and amplitude modulated responsive to said audio signals with said modulated signal being multiplexed on said dedicated line, an audio expander for receiving a modulated signal from the radio frequency generator means and producing an audio signal responsive to audio sounds at a speaker.

12 Claims, 9 Drawing Sheets

Fig_1A1

Fig. 1A2

(CONTINUED FROM FIGURE 1A1)

Fig.1B

Fig_1C

Fig_4

INTERNAL TELEPHONE INTERCOM SYSTEM

This is a continuation of copending application Ser. No. 07/455,602 filed on Dec. 21, 1989, now abandoned.

BACKGROUND OF THE INVENTION

1. Field of the Invention

This invention relates generally to intercom systems and more specifically to an internal telephone intercom system.

2. Description of the Prior Art

The prior art includes many intercom systems which are associated with telephones. However, these generally require separate wiring and complex circuitry, including alternating current power sources. For home use, such intercom systems are inconvenient because of the special wiring requirement. Within homes, to distribute special wirings around various rooms is complex, time consumming and very costly.

Furthermore, with intercom systems in business environments, specific persons are generally associated with certain fixed locations. Accordingly, at a business location, when calling someone over an intercom, the caller would automatically call the designated station where that person is expected to be found. However, in homes and small business environments, people are not as likely to be in any specific designated area. Accordingly, when using the intercom system, it is desirable to have the intercom associated with a plurality of different locations where the person may be found.

Also, within the prior art, most multiplexed intercom systems require that once the paged person is reached, the paged person must then have hands-on operation of a telephone set in order to relay a return message. This is time consumming and inconvenient to both the caller and the called.

SUMMARY OF THE PRESENT INVENTION

It is therefore an object of the present invention to provide an internal intercom system which does not require any special wiring and may be associated with a twisted pair of a standard telephone system.

It is a further object of the present invention to provide an internal intercom system wherein the message is conveyed over a plurality of telephone speakers simultaneously.

It is a further object of the present invention to provide an internal intercom system wherein the paged person can respond and communicate with the caller through the intercom system without having to physically handle the intercom devices.

It is a further object of the present invention to provide an internal intercom system which is operables off of an individual direct current power source.

It is a further object of the present invention to provide an internal intercom system which can be added to existing telephone systems without the need of modifying such telephones.

It is a further object of the present invention to provide an internal intercom system which can be used as a standard telephone and plugged into standard existing wall jacks and which conform to Federal Communication Commission Rules Part 15 and 68.

An exemplary embodiment of the system of the present invention includes an integrated circuit responsive to a direct current battery source and which is connected to a radio frequency circuit such that the intelligence carrying intercom signal to be transmitted over the intercom lines is increased in frequency to a value exceeding 270 kHz and signals received from another terminal are transmitted and received at different frequency greater than 270 kHz. One example of the originate frequency is 360 kHz and the answer frequency is 420 kHz. The system includes a means to sense the ambient background noise at the recipient terminal such that when the intended recipient (paged person) vocalizes a response which is at a volume level higher than the background noise, the intercom receives the response and transmits it back to the original broadcast station. The intercom signals are transmitted along the twisted pair of telephone lines at a higher frequency than those of the normal telephone signals and power signals so as not to interfere. Also, the intercom system can be used to communicate messages simultaneously when the telephone is in use such that during the time the intercom is being utilized, it does not interfere with the telephone line messages. As such, standard telephones with the intercom circuitry added to it may be plugged into existing telephone wall jacks and the entire system conformed to the Federal Communication Rules Parts 15 and 68.

It is an advantage of the present system that an internal intercom system may be incorporated without the need of special wiring and existing twisted pair wiring may be incorporated.

It is a further advantage of the present invention that an internal intercom system may be incorporated which may be operable off a DC battery source.

It is a further advantage of the present invention that an intercom system may be utilized wherein the paging information may be broadcast over all of the intercom terminals.

It is a further advantage of the present invention that the intended recipient of the message may respond without having to physically operate the terminals.

A further advantage of the present invention is that the carrier frequencies may be readily changed so as to avoid interference or to allow multiple intercom channels over a common twisted pair wiring.

These and other objects and advantages of the present invention will no doubt become obvious to those of ordinary skill in the art after having read the following detailed description of the preferred embodiment which is illustrated in the various drawing figures.

IN THE DRAWING

FIG. 1A, 1B and 1C comprise a schematic diagram of an internal intercom system of the present invention, with FIG. 1A segmented as FIGS. 1A1 and 1A2;

DETAILED DESCRIPTION OF THE PREFERRED EMBODIMENT

FIG. 1 is a circuit diagram of an internal intercom system of the present invention, and referred to by the general reference character 10. In the drawings, FIG. 1 is included on three sheets. The interconnections between the various sheets are designated numerically.

The system 10 includes an interface network 12 to tie into a telephone jack and terminals within a building or location. A radio frequency (RF) circuit 14 for converting the audio signal to radio frequency signal is connected to the interface network 12. A compander (compression/expander) network 16 is tied to the interface network 12 for compressing and expanding transmitted and received intercom signals.

The RF circuit 14 is also tied to a 28-pin integrated circuit network 18. The integrated circuit 18 is tied to a DC battery power supply network 20 and an oscillator frequency adjust network 22 which is adapted to adjust for an answer frequency of 375 kHz and an originate frequency of 320 kHz.

A hands-free audio transmit network 24 is connected to the compander network 16 and the integrated circuit 18. The compander 16 performs the functions of compressing the dynamic range of signals modulating the transmitter and expanding the detected signals back to the normal range on receiving. The hands-free network 24 is adapted to receive, amplify and activate the transmitter response from the intended recipient of the broadcast signal without the need of the recipient making any physical contact to the system 10. The network 24 monitors the ambient background noise and if the volume level of the recipient exceeds such background noise level, the network 24 distinguishes it and activates the transmitter for receipt by the calling station.

A light emitting diode control circuit 26 is connected to the integrated circuit 18 at its LED terminal 4. The circuit 26 controls the on-off duty cycle of the LEDs on the panel of the intercom system 10. The LED duty cycle indicates if the intercom system 10 is in use; is in the page mode; or is in the busy mode. For example, if the intercom system 10 is connected and in use, the duty cycle provides a continuous signal to the LED so that the LED is on continuously. If a page has been transmitted over the intercom 10, but not been answered, the LED duty cycle circuit 26 provides a one second flash rate to indicate that the page has not been answered. On the other hand, if the page has been answered, the LED duty cycle circuit 26 will provide a one-quarter second flash rate so as to indicate that the intercom is busy.

Connected to the speaker driver terminal of the integrated circuit 18 is a speaker driver circuit 28. Thus, the message from the calling station is broadcast at the location of the speaker.

Also, the intercom system 10 has the capabilities of dialing while the receiver is on-hook. Accordingly, an on-hook dial network 30 interfaces with the hook on and off terminals and to the speaker connect (SPK CON) terminal of the integrated circuit 18. The output of the on-hook dial circuit 30 is further tied to an interface circuit 32 to the hook switch and dialer power.

The network 10 further includes a momentary intercom button and hook transition logic circuit 34 to activate the intercom system 10 for communication.

Referring more specifically to the individual circuits, the interface circuit 12 has a dual tone multiple frequency terminal (DTMF) 50; a microphone audio terminal 52; a headphone terminal 56; a headphone return terminal 58; a tip ring terminal 62 and a ring terminal 64. The headphone return terminal 58 is tied to a switch plus potential 66. The switch plus potential indicates that the system 10 is on audio. The switch plus 66 is not on during the on-hook dialing function of the system. The headphone return 58 and the switch plus 66 is tied to a semiconductor 70.

As previously mentioned, the intercom network 10 is also adapted to work with a two-line, twisted-pair telephone system. In a two-line version, the FCC requires that the two lines be isolated from each other by at least fifteen hundred volts. Accordingly, in utilizing a two-line system, the ring terminal 64 is tied to an isolation capacitor which is positioned within a block 78.

The compander network 16 includes an expander 80. The expander 80 provides a one-to-two expansion, i.e. for each db rise in audio level in the input, the output rises two db. The expander 80 has an input terminal 81 tied to a capacitor 84 which extends to the headphone terminal 56. Also, the expander 80 has an input terminal 86 tied to the capacitor 84. The expander 80 has a further input terminal 88 tied to a resister 90 which is also tied to a terminal 92. The terminal 92 is tied to a capacitor 94 extending to the mike audio terminal 52. The expander 80 has an output terminal 96 tied to a capacitor 98. The expander 80 has a further output terminal 100 tied to the terminal 96 and capacitor 98, and an output terminal 102 tied to a grounded capacitor 104.

Also tied to the mike audio terminal 52 is a microphone bias resistor 106 which is tied to the capacitor 94. Also, a resistor 108 is tied to the junction of terminal 88 and resistor 90. The combination of the resistors 90 and 108 provide for a page tone/side tone level. Also tied to the resistor 108 is the dual-tone multiple frequency terminal 50. Terminal 50 is also tied to a page tone transmit level resistor 110 which in turn is tied to a terminal 112 of a compressor network 114.

The compressor network 114 provides for two-to-one compression, i.e. for each db rise in audio level of the input and output only rises one-half as much. An input terminal 116 of the compressor 114 is tied to the junction terminal 92, and an input terminal 118 of the compressor 114 is tied to a junction 120. An output terminal 122 of the compressor 114 is tied to a resistor 123 which is tied to the terminal 120 through a capacitor 124. Also, resistor 123 and an output terminal 126 are tied to the network 24. An output terminal 130 of the compressor 114 is tied to a grounded capacitor 132. The combination of the expander 80 and compressor 14 improves the signal-to-noise ratio of the audio, e.g. by fifteen to forty decibels, and thus the quality of the audio signal. Also tied between the input terminal 112 and the terminal 120 is an RC network of a resistor 136, a capacitor 138 and a resistor 140.

The radio frequency circuitry 14 is adapted to convert the audio signals to radio frequency signals. The radio frequency signals, which contain the intercom information, are then multiplexed on top of one of the existing telephone lines. Circuitry 14 includes a front-end bandpass filter network 141 wherein the center frequency is 350 kHz. Input to the filter 141 is tied to the tip and ring terminals 62 and 64. The filter 141 includes a capacitor 142 tied in series with the primary winding of a transformer 143 which is also tied to the ring terminal 64. The secondary of transformer 143 is tied to ground and to an LC circuit of an inductor 144 and a capacitor 146. The LC circuit is tied to ground. The center tap of the output winding of the transformer 148 is tied to a terminal 152 which in turn is tied to a series RC network of a resistor 154 and a capacitor 156 to ground. Terminal 152 is also tied to a resistor 158 which in turn is tied to a capacitor 160 to ground. The filter 141, at the junction of the resistor 158 and capacitor 160, is tied to a pair of switches 162 and 164 with one terminal of the switch 162 tied to one terminal of the switch 164. A switch 168 is tied to the common terminals of the switches 162 and 164. Switch 162 has a terminal tied to a CMOS plus potential 170 and to ground through a capacitor 172. The switch 162 is also tied to a battery potential 174 through a resistor 176. A switch 178 is tied to the switch 168 and to the junction of the resistor 154 and capacitor 156. Switch 178 is further tied to a bandpass filter 179 comprising a grounded capacitor 180, an inductor 182, which in turn is tied to a grounded capacitor 184 and to a capacitor 186. The bandpass filter 179 has a center frequency of 55 kHz. The capacitor 186 is tied to a resistor 188 which in turn is tied to the automatic gain control/intermediate frequency gain (AGC-/IFG) terminal of the integrated circuit 18. The capacitor 186 is tied in series to an inductor 190 tied in series with a resistor 192 to the intermediate frequency one output terminal (IF1 OUT) of integrated circuit 18. Inductor 190 is also tied to the AGC/IFG terminal. A bypass capacitor 194 is tied between ground and the IF1 OUT terminal. Also, the resistor 188 is tied to a grounded bypass capacitor 196 and, through a capacitor 198, to the speaker decouple (SPK DEC) terminal of the integrated circuit 18. The capacitor 186 is also tied to the intermediate frequency one input terminal (IF1 IN) of the integrated circuit 18. The resistor 192 and capacitor 194 are tied to a capacitor 200 which in turn is tied to the IF2 IN terminal of the integrated circuit 18. A resistor 202 is tied to the IF2 IN and to a capacitor 204 which in turn is tied to the IF1 IN detector in (DET IN) terminal. The IF2 IN terminal of the integrated circuit 18 is tied to the junction of the resistor 202 and capacitor 204. An RC circuit of a resistor 206 and two capacitors 208 and 210 are tied between the CR SENS terminal and detect output (DET OUT) terminals of the integrated circuit 18. Also the detect audio (DET AUD) terminal of the integrated circuit 18 is tied to a grounded bypass capacitor 212 and to the expander network 80.

The oscillator frequency adjust circuit 22 includes a variable inductor 214 tied across a pair of grounded capacitors 216 and 218. A capacitor 220 is tied to the capacitors 216 and inductor 214 and to the integrated circuit 18 at the originate (-ORIG) terminal of the integrated circuit 18. The capacitor 218 and inductor 214 are tied to the oscillator in (OSC IN) terminal of the integrated circuit 18. The inductor 214 and capacitors 216 are tied through a capacitor 222 to the oscillator output (OSC OUT) terminal of the integrated circuit 18. Also the transmit (TX) terminal of the integrated circuit 18 is tied to the switch 164 so as to provide a transmit enable signal to the integrated circuit 18.

The LED control circuit 26 is tied to the LED terminal of the integrated circuit 18, and includes a bypass capacitor 226 and a resistor 228 which in turn is tied to a darlington network 230. The output of the darlington is tied to a resistor 232 and in turn tied to a light emitting diode 234 the anode of which is tied to a zener diode 236 which is in turn tied to the battery potential 174. The darlington network 230 controls the time constant of the signal to the LED such that when the LED is solid and a continuous signal is provided, it may indicate that the intercom is connected. A long time cycle, for example one second, may indicate that someone is being paged. A shorter time cycle, for example one quarter second flash rate, can indicate that the intercom is currently busy.

The speaker driver circuit 28 is tied to the speaker driver (SPK DRV) terminal of the circuit 18 and includes an emitter follower network 238 of which one side is grounded and the other side is tied to a bypass capacitor 240 and through a resistor 242 to the battery source 174. The emitter follower 238 in turn is tied through a capacitor 244 to a speaker 246. The emitter followers serve as high current drivers. In some instances, it is necessary to suppress very high frequency oscillations, in which case a grounded RC network of a resistor 248 and capacitor 250 may be tied to the emitter followers. The speaker volume to the speaker 246 may be controlled by a potentiometer 252 which extends through a series resistor 254 and capacitor 256 to the headphone jack 56 through the capacitor 84.

The battery indicator circuitry 20 includes a nine-volt battery 260 which is tied to a connector 262, one terminal of which is tied to ground. The other terminal of switch 262 is tied to the battery voltage terminal 174, the VCC terminal of the integrated circuit 18 and to a capacitor 264 which extends to ground. The VCC terminal is also tied through a transistor 266 to capacitor 268 to ground and to the SW plus terminal 66. The transistor 266 is tied through resistor 270 to the -SW terminal of the integrated circuit 18.

The on-hook dial network 30 includes a pair of hook terminals 280 and 282 which are tied to the emitter and collector of a transistor 284, the base of which is tied to a resistor 286. The resistor 286 is tied to a transistor 287, the emitter of which in turn is tied to ground. The base of transistor 287 is tied to the emitter of a transistor 288 and ground through a resistor 289. The base of transistor 288 is connected to a disconnect terminal 290 and through a field effect transistor 290 to a microphone terminal and through a diode 291 to the hook switch. The collector of the transistor 288 is tied to a resistor 292 and a switch 293 to the SPK CON terminal. The collector of transistor 288 is tied to a LED 294 tied to the VBAT 174. Also, a filter capacitor 295 extends to ground from the switch 293. The network 30 allows a person to dial while the handset is on hook. Once the caller indicates receipt of the call, this can be detected through a speaker though the caller must then pick up the handset in order to transmit a message.

The interface circuitry 32 includes a diode 300 which in turn is tied to the SW+potential 66 and to a dialer power interface terminal 306 and to a resistor 308 extending to the battery power 174.

The hands-free circuitry 24 includes a grounded crystal microphone 310 which is tied to a low level audio amplifier having a transistor 312, the collector of which is tied through a resistor 314 to the VBAT source 174. The microphone 310 is also tied to a field effect transistor (FET) 318 through an RC network of a capacitor 319 and a pair of resistors 320 and 321. The FET is also tied to the CMOS potential 76 and to the collector of the transistor 312. The FET 318 is also tied to a transistor 322, the emitter of which is tied to a resistor 323. A transistor 324 is connected to the mike hook (MIKE/HK) terminal of the circuit 18 through a resistor 326 and blocking capacitor 327. Resistor 326 is tied to a grounded resistor 328 and to a resistor 330 which is tied to the FET 318. The resistor 326 is also tied to a blocking capacitor 332 which in turn is tied to the microphone terminal (MIKE/HK) of the integrated circuit 18. The transistor 312 is also tied to a diode 334 which in turn is tied to the interface network 332. The MIKE/HK terminal is tied to a transistor 336 which is tied to the hook switch. The hands-free circuitry 24 further includes the signal processing component for determining the level of the background ambient noise and which comprises a capture threshold circuitry tied to the capture sensing (CP SENS) terminal of the integrated circuit 18. The CP SENS terminal is tied to a resistor 340 extending to FET 318, to a grounded capacitor 342 and to a transistor 346 which extends through a transistor 347 to the SL BIAS terminal of circuit 18. The emitter of transistor 346 is grounded and the collector is tied to the resistor 340 and capacitor 342. The ambient level is controlled by an ambient level network comprising a resistor 358 tied to the ambient terminal of the integrated circuit 18 and to a diode 360 to the SW+ potential 66. The ambient level terminal is also tied to a grounded capacitor 362. Accordingly, the hands-free network 24 provides for means whereby the background noise is sensed when the intercom system 10 is activated by a message being transmitted. Then, once the intended recipient announces his or her presence at a level above the noise level at the closest receive set 10, the intercom automatically enables the transmitter and transmits the announcement. Thus, the intended recipient is able to respond to the intercom message without personally activating any circuitry.

Intercom activated circuit 34 includes a momentary intercom switch 366 which is tied to a transmit enable line 368. Four field effect transistors 370, 372, 374 and 376 are connected to the switch 366. Transistor 370 is tied to the switch 366 through a capacitor 378 and to transistor 372 through a capacitor 380. Transistors 370 and 372 are tied to the hands-free circuitry 24. Transistors 370 and 374 are tied to the voltage source 66 through a diode 382 and transistors 370 and 372 are tied to the VBAT potential source 174.

Figure 1A:
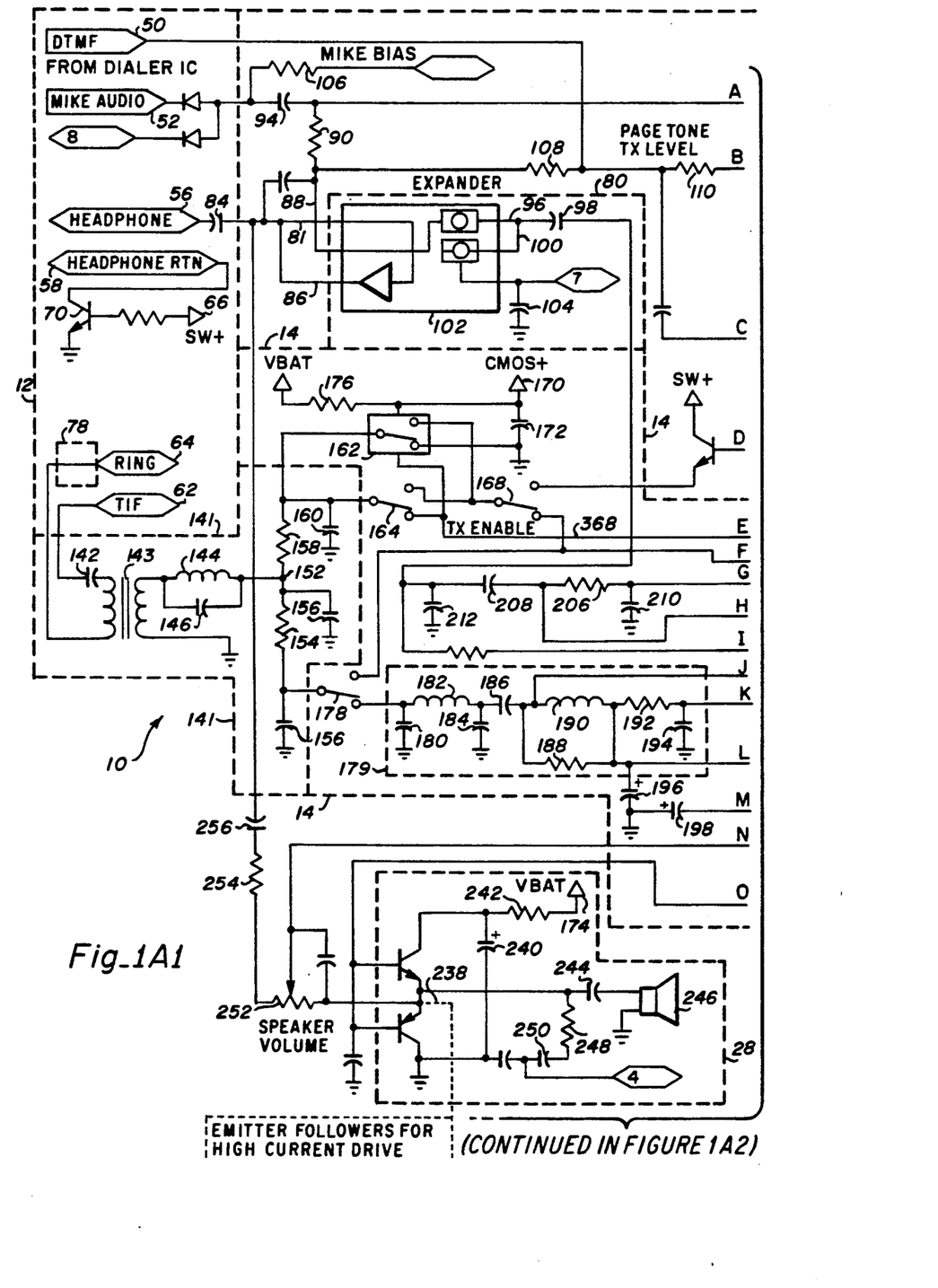
Figure 1A:
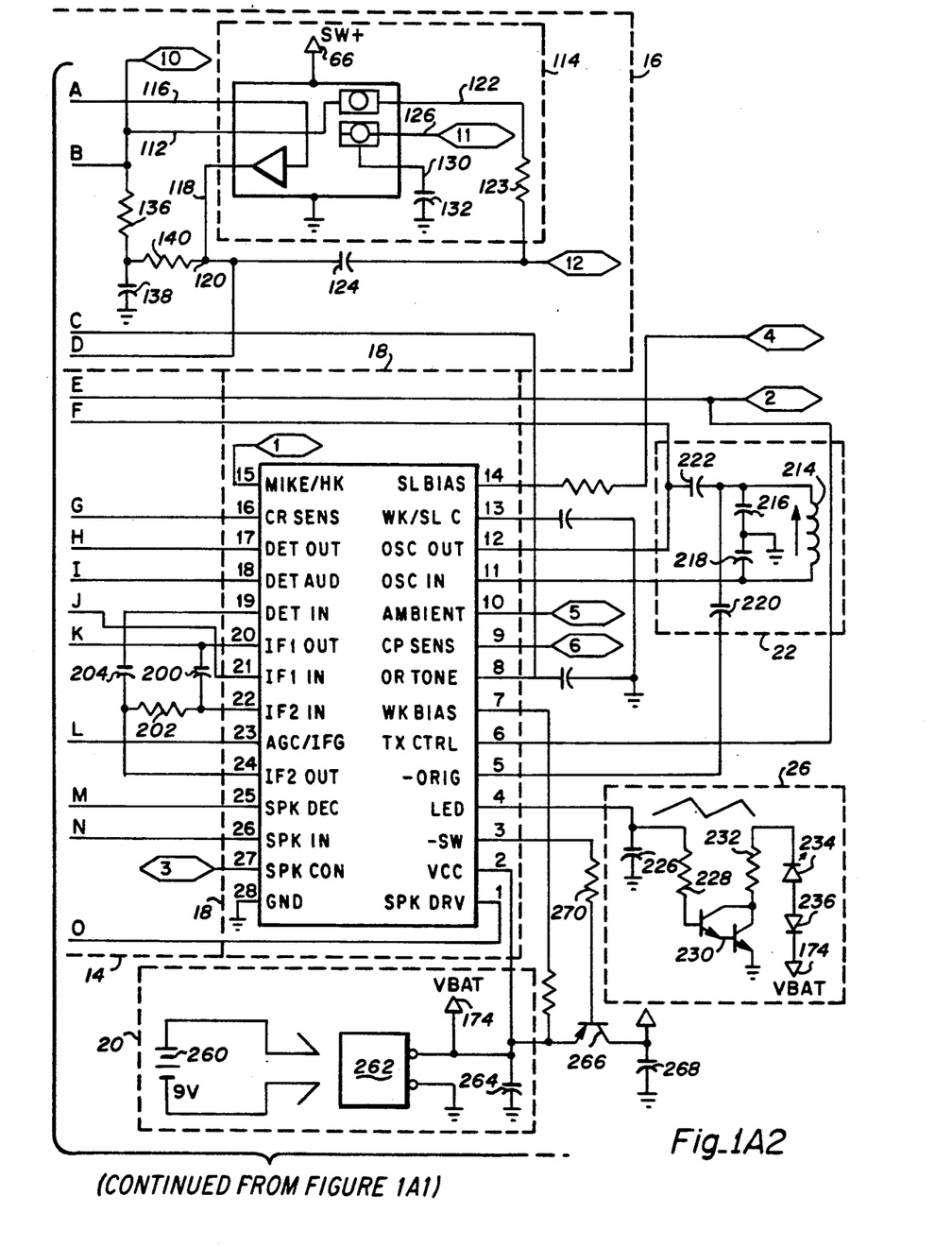
Figure 1B:
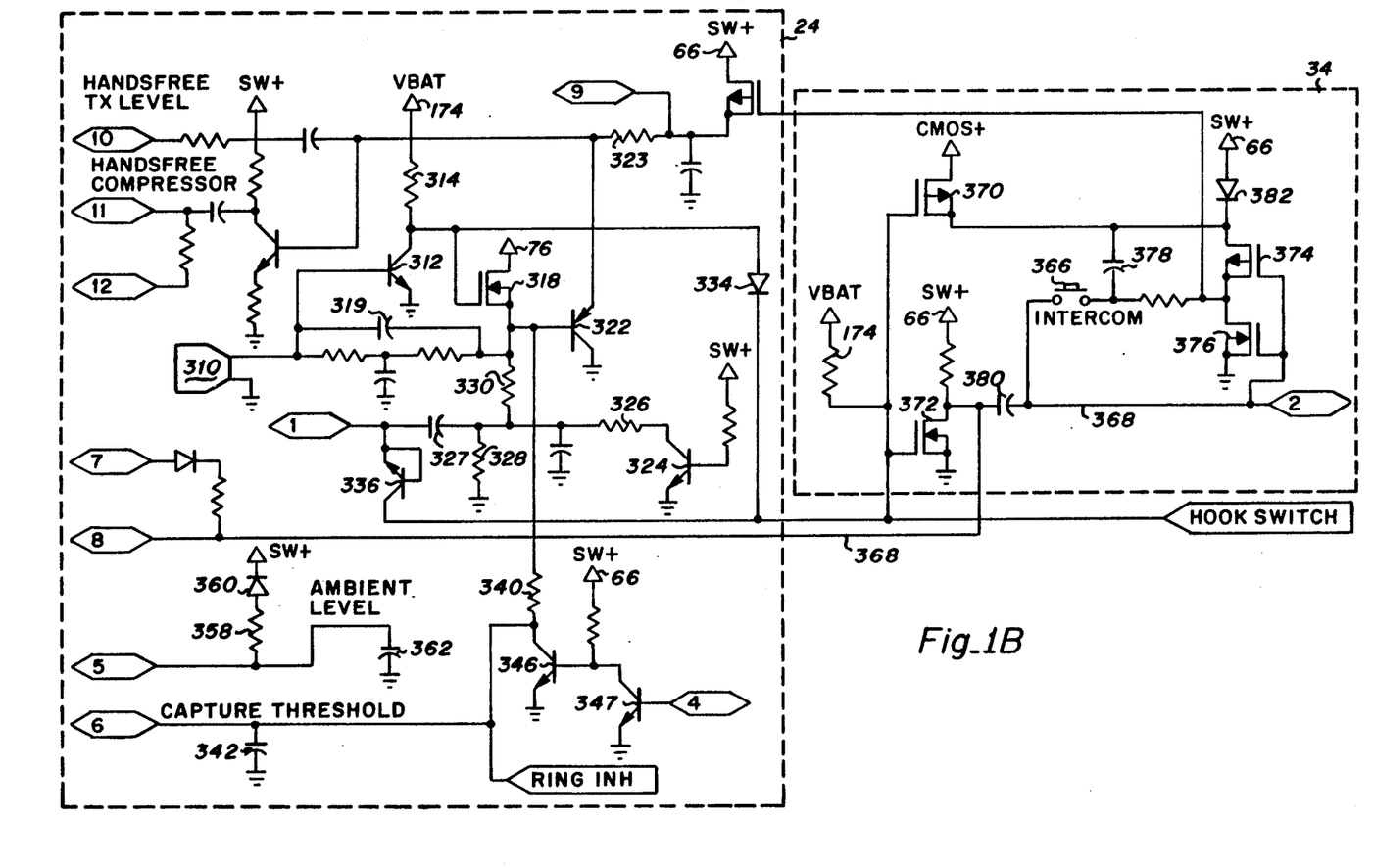
Figure 1C:
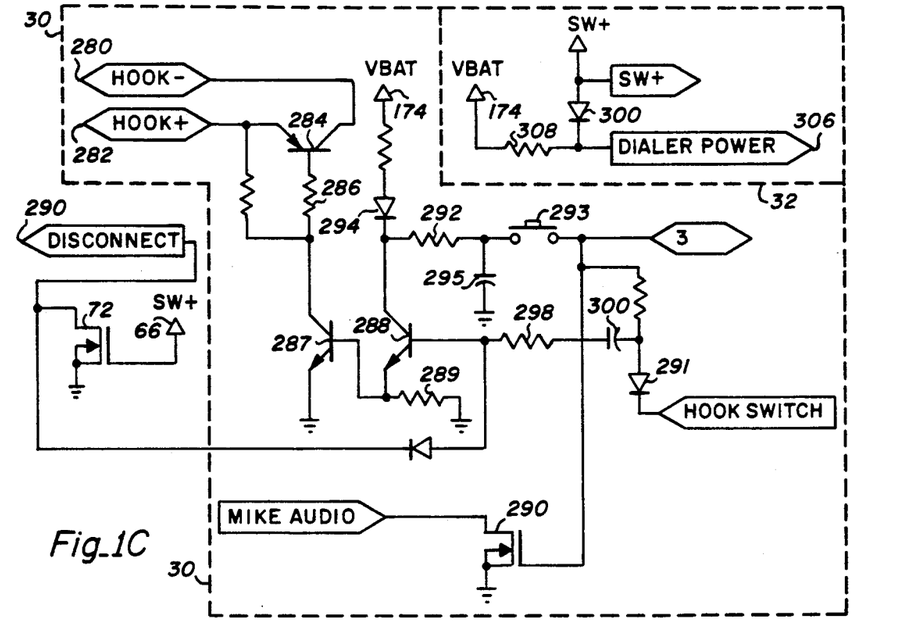
Figure 2A:
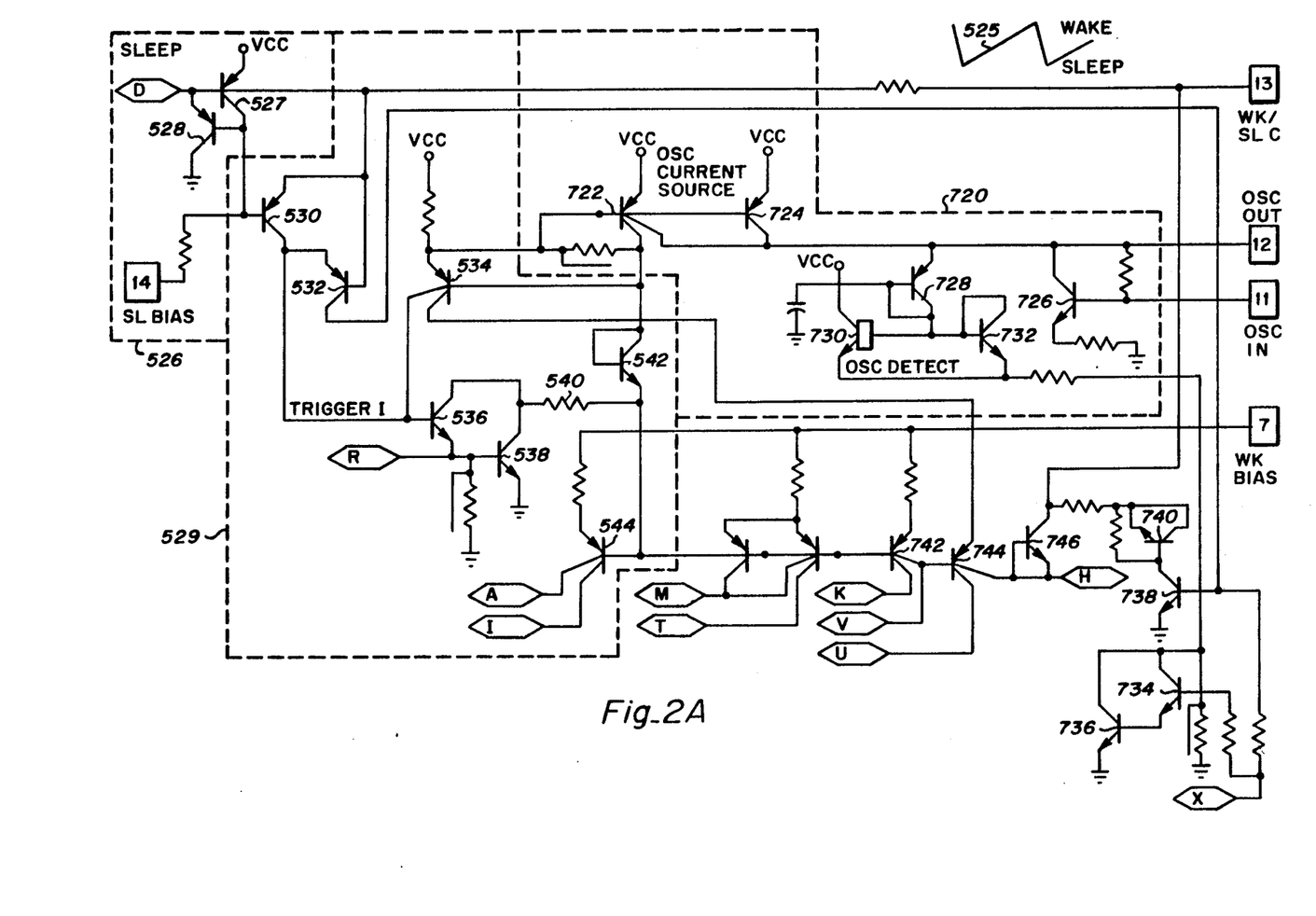
FIGS. 2A, 2B, 2C and 2D comprise a circuit diagram of the integrated circuit of the system of FIG. 1.
Figure 2B:
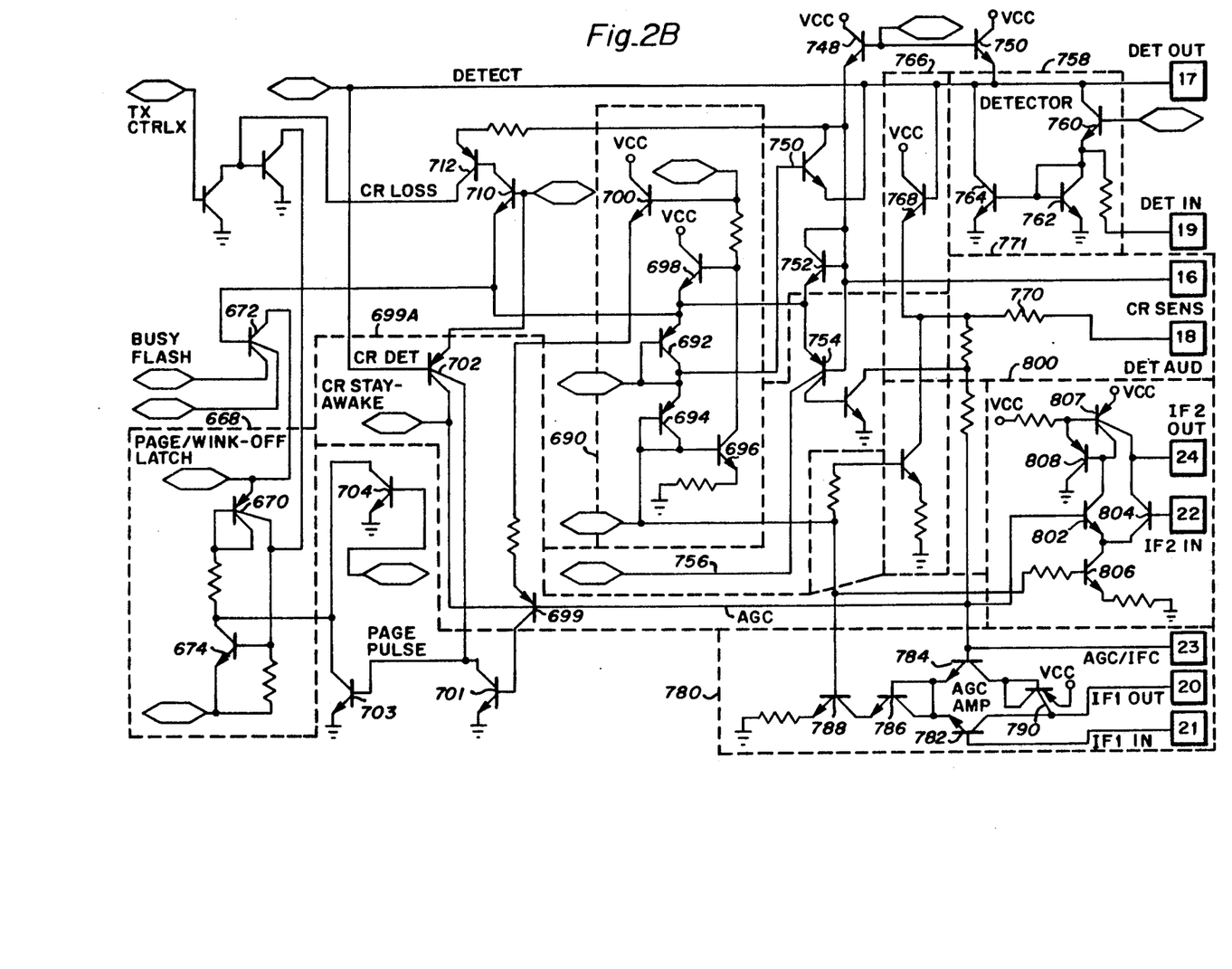
Figure 2C:
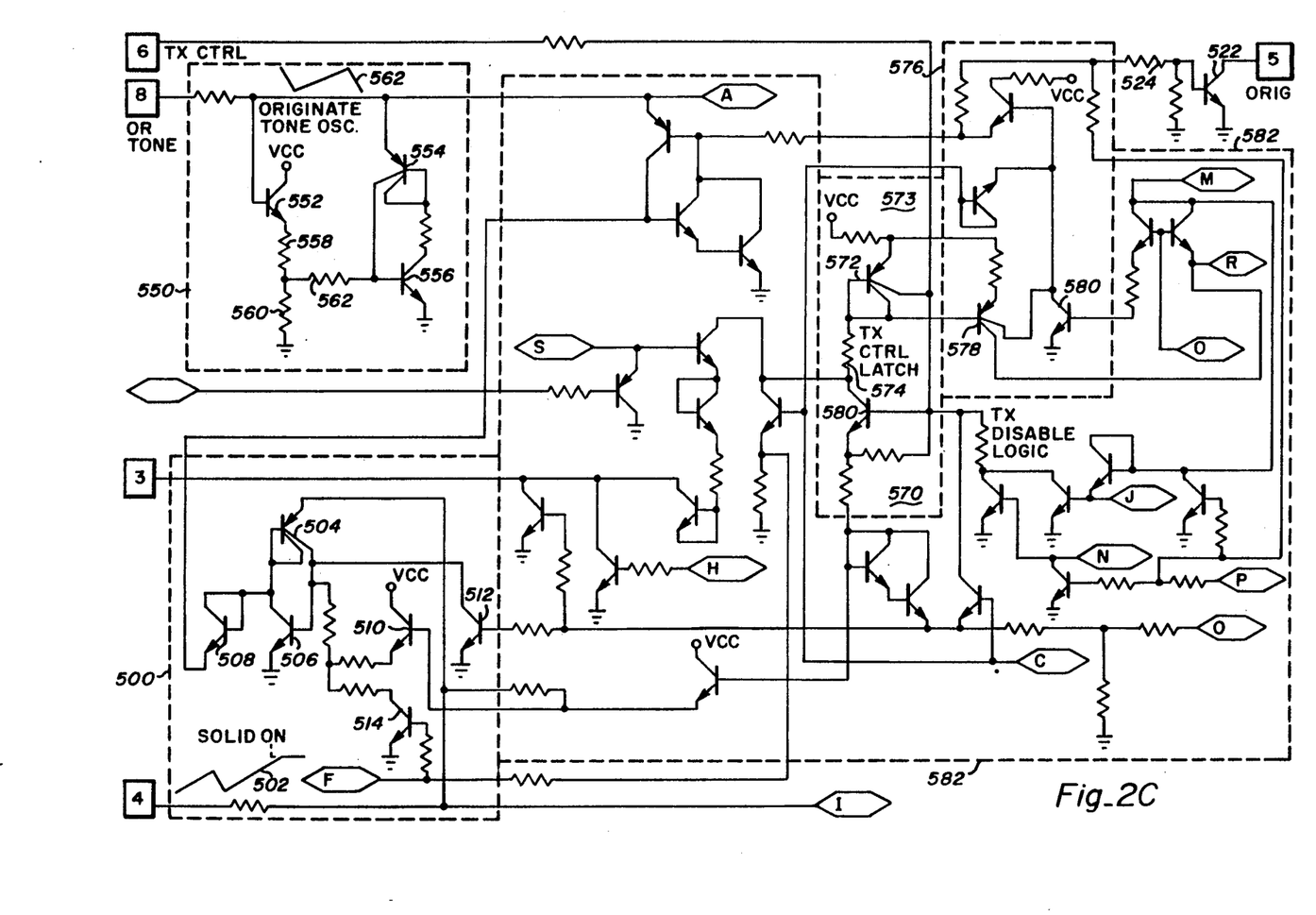
Figure 2D:
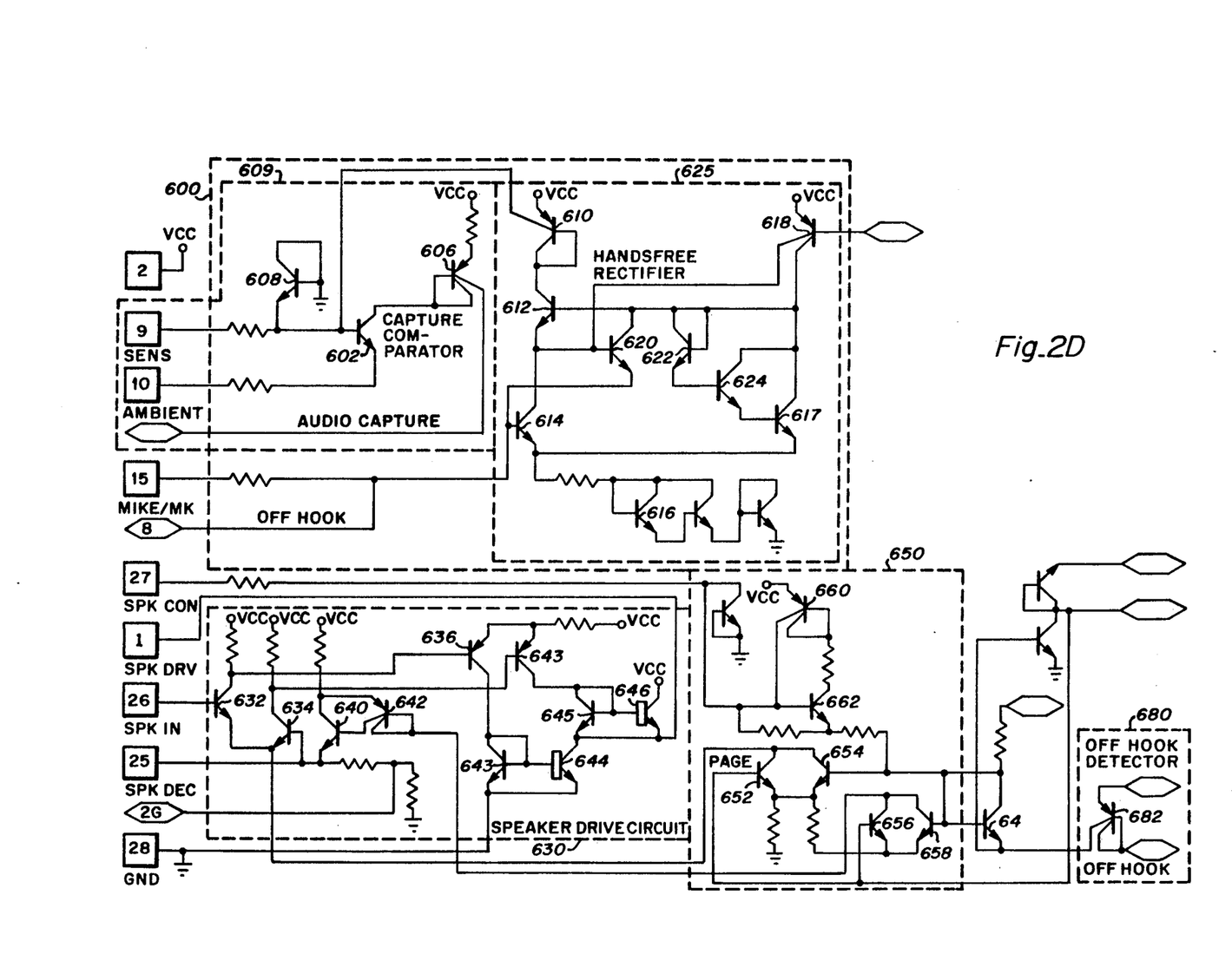
Figure 3:
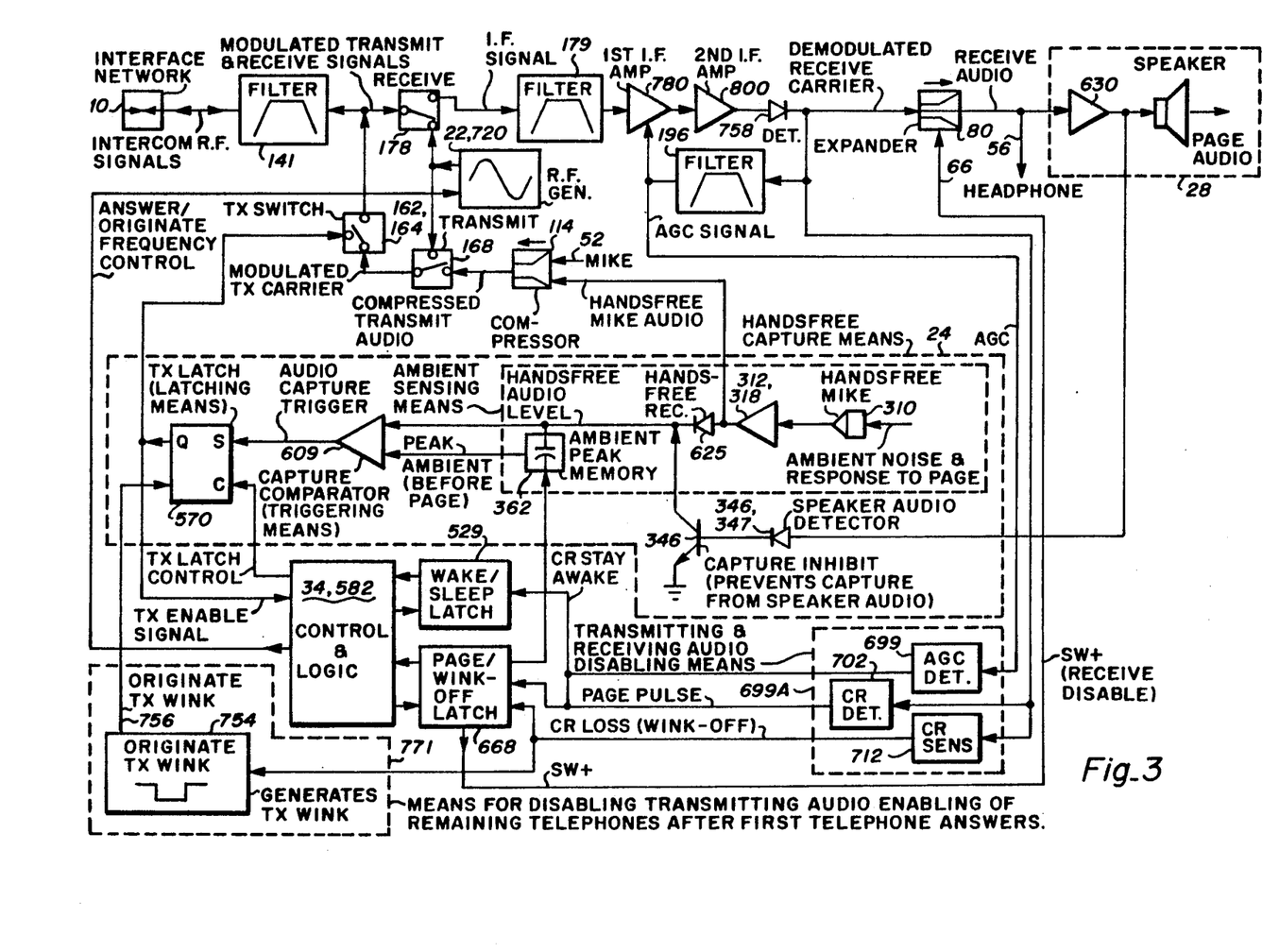
FIG. 3 is a block diagram of the internal intercom system of FIGS. 1 and 2.
Figure 4:
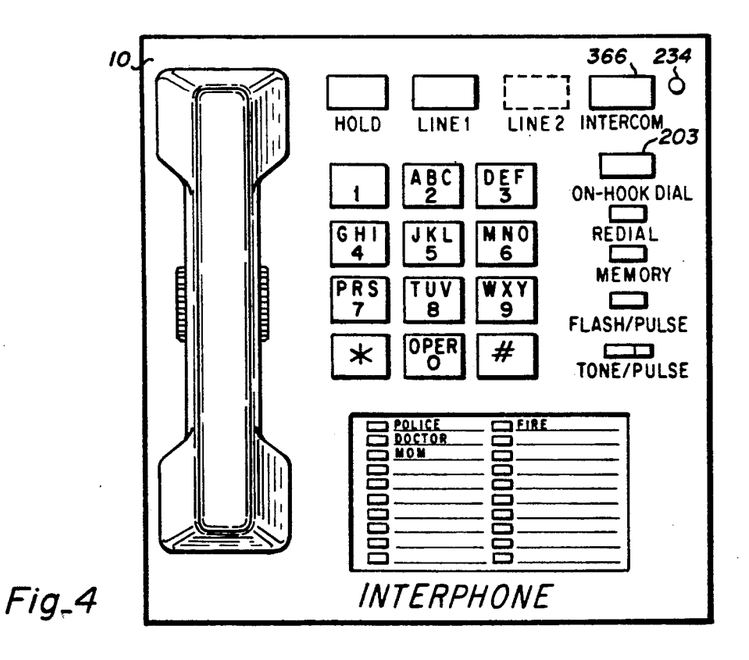
FIG. 4 illustrates the face and panel of a telephone handset incorporating a system of the present invention.

FIG. 3 illustrates the panel of the internal intercom of system 10 of the current invention. As evident, the console may be a standard type console with the addition of the LED 234, the intercom switch 366 and on-hook dial switch 293. The system may have one or two incoming lines in which case the buttons for each line are designated "Line 1", "Line 2". The LED 234 reflects the mode of the intercom. Also, the on-hook dial switch 293 is provided to activate dialing capability when the handset is in the cradle. Thus, to incorporate the internal intercom system of the present invention, a standard type of telephone console may be incorporated with the addition of system 10.

In operation, when it is desired to broadcast a message to someone within range of the intercom system, the momentary intercom button 366 is pushed. Then the message is announced over the intercom system 10. This is broadcast at each of the consoles tied into the system. The paged person may then respond hands-free and as long as the volume of the response exceeds the background noise at the console 10 closest to the recipient, or by pushing the intercom button 366, the response is relayed to all consoles including the originating console. If the message is that the paged person has a telephone call on hold, then the paged person can take the call at the closest console. If persons desire to communicate over the intercom, they can readily do so without any handling of the physical equipment, i.e. hands free. If the paged person is to take a telephone call on hold, the paged person merely activates the line button at the closest console and takes the telephone call.

The intercom system 10 operates with the D.C. power source 260, i.e. a nine-volt battery. Thus, there is no need for an A.C. power source or any special wiring. The intercom signal is multiplexed on top of the audio signal. The intercom signal is above the audio range at 270 kHz, but typically below 500 kHz and meets Federal Communications Commission (FCC) regulations regarding out-of-band energy on telephone lines. The intercom system 10 is merely added in combination with a standard telephone console. There is no need for any wiring outside of the console.

FIG. 2 is a schematic of the integrated circuit 18. Each of the twenty-eight terminals on the circuit 18 shown in FIG. 1 are also shown in FIG. 2 with the corresponding numbers. At terminal 2 is the VCC voltage which is equivalent to the potential terminal 174 of the system in FIG. 1. This provides the VCC potential to the circuit 18. Also, FIG. 2 is included on four sheets. The interconnections between the various sheets are designated by letters.

At terminal 3 is the SW control terminal (-SW) which is tied to a light emitting diode flashing oscillator network 500. Terminal 4, which is the LED/flash terminal is also tied into the LED flashing oscillator circuit 500. As illustrated, circuit 500 includes a relaxation oscillator which produces a semi-saw tooth type waveform to flash the LEDs and a constant level signal to maintain the LED at a solid on position. Within the block 500 is illustrated a waveform 502 to illustrate such conditions. As previously mentioned, when the intercom system 10 is on and the message has not been returned, the LED flashes. This is a result of the waveform 502. When the answer is made over the intercom, then the LED takes a constant "on" indication which is also indicated by the waveform 502. The circuit 500 includes a latching circuit transistor 504 of which the base is tied to the collector of a transistor 506 and to the collector of a transistor 508. The emitter of the transistor 504 is tied to the line on terminal 4 and to the base of a transistor 510. The collector of the transistor 504 is tied to the collector of transistor 512, to the base of the transistor 506 and to a resistance network which in turn is tied to the emitter of the transistor 510 and to the collector of transistor 514. A solid LED signal is fed to the collector on the transistor 512 and the alert flashing signal is generated at the emitter of the transistor 504.

The originate terminals 5 is tied to a network which includes a transistor 522 of which the collector is tied to the originate terminal 5. The base of the transistor 522 is tied to an input resistor 524.

The wake and sleep terminal 13 (WK/SL) has a "wake-sleep" signal of a waveform as illustrated by the waveform 525, varying between a "sleep" position to a "wake" position. The terminal 13 is tied to a sleep bias network 526 which includes a transistor 527 and a transistor 528 tied between the base and collector. The collector is further tied to a wake/sleep latch circuit 529 having a pair of transistors 530 and 532 and to the sleep bias (SL BIAS) terminal 14.

The wake and sleep terminal 13 (WK/SL) is also tied to collector of a transistor 527 so as to control its conductance and thus the wake/sleep latch 529. The wake/sleep latch circuit 529 further includes a transistor 534 of which the collector is tied to the base of a transistor 536 which receives trigger signals. The emitter of the transistor 536 is tied to the base of a transistor 538 with the collectors of the transistors 536 and 538 tied together and in turn tied to a resistance 540 which extends to the emitter of a transistor 542. The emitter of the transistor 542 is tied to the base of a transistor 544. The emitter of the transistor 544 is tied to the wake bias terminal 6. The collector of the transistor 544 is tied to the wake bias (WK BIAS) terminal 7 such that power is applied to the page tone circuit when the wake/sleep latch is enabled.

The original tone terminal (OR TONE) 8 is tied to an originate tone oscillator circuit 550 which includes a transistor 552, a transistor 554 and a transistor 556. The base of the transistor 552 is tied to the terminal 8 and the emitter is tied through a voltage divider network of resistors 558, 560 and through a resistor 562 to the base of the transistor 556 and to the controller of the transistor 554. A collector and base of the transistor 554 are tied together and in turn to the collector 556. Accordingly, the originate tone oscillator 550 generates a tone at the OR TONE terminal 8. The tone signal is illustrated by the waveform 562. Thus, the oscillator network 550 provides a page tone pulse which also appears at the emitter of the transmitter 554. Thus, as previously described, the system constantly vacilates between the wake and sleep condition and then when a page transmission is generated at any of the terminals, all of the terminals 10 are then placed into a wake mode so as to receive the message from the originating terminal. Once the system is in the wake position and the message is toned, then the flashing signal is also generated at the LED flash terminal 4 so as to provide a visual indication at all terminals.

A transmitter control (TX CTRL) terminal 6 is tied to a transmitter control latch circuit 570 which includes a transistor 572 of which the gate is tied to the transmitter control terminal 6. The base and collector of the transistor 572 are tied together and in turn to a resistance 574 and to an originate latch circuitry 576 at the base of a transistor 578. The transmitter control latch circuit 570 further includes a transistor 580 of which the base is tied to the collector of the transistor 578 and the base is tied to a logic network 582.

The capture sense terminal (CP SENS) 9, ambient terminal 10 and crystal mic hook terminal (MIKE HK) 15 are all tied to a hands-free threshold logic network 600. The purpose of the hands-free threshold logic network 600 is to constantly analyze the background noise at the terminal and to average it for the most recent five seconds. Thus, after the page transmission is received the ambient level is frozen and the intended recipient of the message speaks up, the hands-free threshold logic at each of the terminals knows the previous ambient background level. Then when the intended recipient announces an acknowledgment, the crystal microphone receives such signal and if it exceeds the background noise by a preset amount, a signal responsive to the acknowledgement is generated without the page recipient even touching the apparatus.

The ambient terminal 10 is tied to a capture comparator including a pair of transistors 602 and 606 of which the collectors are tied together. The base of the transistor 602 is tied to the capture sense terminal 9 as is the emitter of a zener diode 608. This circuitry, referred to by the broken line 609, provides a means for triggering a latching means. The base of transistor 602 is tied to the collector of a transistor 610 of a hands-free rectifier network. The base and collector of the transistor 610 are tied together and in common to the collector of a transistor 612. The emitter of the transistor 612 is tied to the collector of a transistor 614 of which the base is tied to the crystal mic/hook terminal (MIKE/HK) 15. The emitter of the transistor 614 is tied to the base and collector of a transistor 616. Also, the emitter of the transistor 614 is tied to the emitter of a transmitter 617 of which the collector is tied to the collector of a transistor 618. The base of the transistor 612 is also tied to the collector of a transistor 620 and to the collector of a transistor 622. The emitter of the transistor 620 is tied to the crystal mic/hook terminal 15 and the emitter of the transistor 622 is tied to the base of a transistor 624. The emitter of the transistor 624 is tied to the base of the transistor 617 and the collector of the transistors 617 and 624 are tied together in common to the collector of the transistor 618. Also, the collector of the transistor 618 is tied to the emitter of the transistor 612. This circuitry, referred to by the broken line 625, with the transistor 602, provide sensing means for sensing the ambient background noise level. Accordingly, the ambient background noise is stored in the external capacitor and when the intended recipient of the message speaks out through the crystal microphone, it causes the capture sense level to rise above the previously stored frozen ambient level which causes the recipient terminal to capture and enable its transmitter.

The speaker/connect (SPK CON) terminal 27, speaker drive (SPK DRV) terminal 1, speaker in (SPK IN) terminal 26, speaker decouple (SPK DEC) terminal 25 and ground (GND) terminal 28 are all tied to a speaker drive circuit 630. The SPK IN terminal 26 is tied to an input of a transconductance amplifier including a transistor 632, the emitter of which is tied to the emitter of a transistor 634. The collector of the transistor 632 extends to the VCC potential and is tied to the base of a transistor 636. The base of the transistor 634 is tied to the emitter of a transistor 640. The base of the transistor 640 is tied to the gate of a transistor 642. The collector and base of the transistor 642 are tied in common. The collector of the transistor 636 is tied to the base and collector of a transistor 643. The base of the transistor 643 is tied to the base of a transistor 644 and the emitters of the transistor 643 and 644 are tied together. The collector of the transistor 644 is tied to the emitters of a transistor 645 and of a transistor 646. The bases of the transistors 645 and 646 are tied in common to the collectors of transistors 643 and 645. The collector of the transistor 646 is tied to VCC source, the emitters of the transistors 636 and 643 are tied to the VCC source and the emitters of the transistors 645 and 646 are tied to the SPK DRIVE terminal 1. The SPK DEC terminal 25 is tied to the base of the transistor 634. The emitters of the transistors 643 and 644 are tied to GND terminal 28.

The speaker drive circuit 630 is connected to a speaker/connect flip-flop gating circuit 650. The circuit 650 includes an emitter follower of two transistors 652 and 654 with the collectors tied to the emitters of the transistors 632 and 634 of the speaker drive circuit 630. The emitter followers 652 and 654 are in turn tied to an emitter follower of a pair of transistors 656 and 658 with the emitters tied to the emitter followers 652 and 654. The collectors of the transistors 656 and 658 are tied to the transistor 642. The speaker/connect terminal 27 is tied to the gate of a transistor 660 and to the base of a transistor 662. The collector and base of the transistor 660 are tied together and to the collector of the transistor 662.

The integrated circuit 18 further includes a page-wink-off latch network 668 including a transistor 670 of which the base and collectors are tied together and the emitter is tied to the emitter of a transistor 672. The collector of the transistor 670 is tied to the base of a transistor 674 and the emitter of the transistor 674 is tied to a resistor extending to the base.

An off-hook detector network 680 includes a transistor 682 of which the collector is tied to the emitter of a transistor 684 which in turn is tied to the speaker/connect flip-flip negating network 650. The emitter of the transistor 682 is tied to a work bias generator network 690 which provides the wake-up bias for the network. The circuitry 690 includes a pair of transistors 692 and 694. The base and collector of the transistor 692 is tied to the emitter of the transistor 682 of the off-hook detector 680. The collector of the transistor 694 is tied to the base of a transistor 696 with the collector of the transistor 696 tied to the base of a transistor 698. An automatic gain control detector including a transistor 699 has an emitter tied to a transistor 700. The collector of the transistor 699 is tied to a transistor 701. The gate of the silicon controlled rectifier 699 is adapted to receive a stay-awake signal. Also, a transistor 702 has the collector tied to the collector of the transistor 699. The circuitry, referred to by the broken line 699A provides a means for disabling all of the answering transmitting and receiving audio signals when the originating transmitting audio signal is transmitted. The collector of the transistor 702 is tied to receive the Page Pulse from a logic circuit of a transistor 703 of which the collector is tied to the collector of a transistor 704. The collector of the transistor 703 is also tied to the collector of the transistors 674 and 704. The base of the transistor 702 is tied to the detect out (DET OUT) terminal 17. The emitter of the transistor 702 is also tied to the base of a transistor 710. The transistor 710 is also tied to a transistor 712.

An oscillator detect circuit 720 includes an oscillator current source having a transistor 722 and a transistor 724. The base of the transistor 722 is tied to the wake/sleep latch circuit 529 and the collector is tied to the collector of the transistor 542. The collector of the transistor 722 is common to the oscillator output (OSC OUT) terminal 12. Also, the collector of the transistor 724 is common to the OSC OUT terminal 12 and the base of the transistor 724 is common to the base of the transistor 722. The oscillator in (OSC IN) terminal 11 is tied to the base of a transistor 726 of which the collector is tied to the OSC OUT terminal 12. The OSC OUT terminal 12 is also tied to a transistor 728 of which the base and collector are tied together and extend to the bases of a pair of transistors 730 and 732. The emitters of the transistors 730 and 732 are tied in common and extend to the base and collector of a transistor 734. The emitter of the transistor 734 is tied to the base of a transistor 736 of which the collector is tied to the collector of the transistor 734. The base of transistor 734, through a resistive network, is tied to the base of a transistor 738 of which the collector is tied to the base of a transistor 740. The emitter of transistor 740 is tied to the wake/sleep (WK/SL) terminal 13. The circuitry 720 further includes a transistor 742 of which the base is tied to transistor 544 and the emitter is tied to the wake bias (WK BIAS) terminal 7. The collector of transistor 742 extends to the base of a transistor 744, the emitter of which extends to the collector of the transistor 534 and the collector is tied to the base of the transistor 710. The collector of the transistor 744 is tied to the base and emitter of a transistor 746. The collector of the transistor 746 is tied to the wake/sleep terminal 13. The collector of the transistor 744 is also tied to the base of a pair of transistors 748 and 750. The emitter of the transistor 750 is tied to the detect out (DET OUT) terminal 17. The emitter of the transistor 748 is tied to the emitter of the transistor 712. The emitter of the transistor 748 is also tied to the collector of a transistor 750. The emitter of the transistor 750 is tied to the DET OUT terminal 17 and the base is tied to the work bias generator circuitry 690. Also, the emitter of transistor 748 is tied to the base and collector of a transistor 752 and to the base of a transistor 754. The emitter of the transistor 754 is tied to the emitter of the transistor 752 and to the wake bias generator circuitry 690. The collector of the transistor 754 is tied to an originate transmitter wink line 756 which extends to the circuitry 570.

The detect in (DET IN) terminal 19 is also tied to a detector circuitry 758 including a transistor 760 and a transistor 762 with the terminal 19 tied to the emitter of the transistor 760 and to the collector and base of the transistor 762. The collector of the transistor 760 is tied to the DET OUT terminal 17. A transistor 764 has a collector tied to the DET OUT terminal 17 and a base tied to the base of the transistor 762.

An audio buffer circuit 766 is tied to the DET OUT terminal 17 and includes a transistor 768 with the base tied to the terminal 17 and the emitter extending through a resistor 770 to the DET AUD terminal 18. The transistors 748, 752 and 754 are all tied to the CR SENS terminal 16. The circuit 771 provides for disabling the transmitting audio enabling.

A first intermediate frequency amplifier circuit 780 is tied to the automatic gain control (AGC/IFG) terminal 23, to the intermediate frequency one output (IF1 OUT) terminal 20 and to the intermediate frequency one input (IF1 IN) terminal 21. The terminal 21 is tied to the base of a transistor 782 of which the collector is tied to the terminal 20. The emitter of the transistor 782 is tied to the emitter of a transistor 784 and to the collector of a transistor 786. The emitter of the transistor 786 is tied to the collector of a transistor 788, the emitter of which is grounded and the base of which is tied to the wake bias generator 690. The base of the transistor 784 is tied to the AGC terminal 23. The collector of the transistor 784 is tied to the base and collector of a transistor 790. The gate of the transistor 790 is tied to the collector of the transistor 782 and to the IF1 OUT terminal 20.

A second intermediate frequency amplifier circuit 800 is tied between the IF2 IN terminal 22 and IF2 OUT terminal 24. The circuit 800 includes a pair of transistors 802 and 804 with the base of the transistor 802 tied to the automatic gain control signal line of the circuitry 690 and the base of the transistor 804 is tied to the IF2 IN terminal 22. The emitters of the transistors 802 and 804 are tied together to a collector of a transistor 806. The base of the transistor 806 is tied to the first intermediate frequency amplifier circuit 780 and to the wake up bias generator circuit 690. The collector of the transistor 802 is tied to the collector of a transistor 807 and to the base of a transistor 808. The base of the transistor 807 is tied to the emitter of the transistor 808. The gate of the transistor 807 is tied to the IF2 OUT terminal 24.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appending claims be interpreted as covering all alterations and modifications as fall within the true spirit and scope of the invention.

I claim:

1. In an internal handsfree telephone intercom system including line connection means for connection to a designated pair of telephone communication lines, and a plurality of telephone sets having speakers connected to the line connection means and adapted for telephone communications with locations external to said lines by receiving and transmitting telephone signals within a first frequency range, the improvement comprising:

a plurality of telephone sets with each having a first audio receiving means for receiving at each of said telephone sets, audio signals from a microphone within said telephone set;

a radio frequency generator means at each of said telephone sets for generating a carrier frequency of a first frequency, the generator means being connected to the audio receiving means with the amplitude of the generator means being modulated responsive to said audio signals, the generator means being connected to the ring and tip terminals of the set whereby the signal of the radio frequency generator means is multiplexed on said lines and transmitting over said lines within a frequency band excluding said first frequency range;

means for receiving at each of said telephone sets of modulated signal from the radio frequency generator means of another of said sets and producing a responsive audio paging signal at said speakers of said telephone sets; and a sensing means at each of said telephone sets for sensing the ambient background noise level at said telephone sets for a predetermined time increment before receiving said paging signal, a means for triggering a latching means for enabling the transmitting audio signals of one of said telephone sets which is the first to be triggered whenever the voltage level following said paging signal exceeds said ambient background noise level after said predetermined time increment;

a means for disabling the transmitting audio enabling and receiving audio signals for other telephone sets following the enabling of the first telephone set transmitting audio signal; and a means for disabling all the answering transmitting and receiving audio signals when the originating transmitting audio signal is terminated.

2. The system of claim 1 further including, a compander for compressing and expanding the amplitude of said audio signals.

3. The system of claim 1 further including, transmit enable circuit means for generating a tone signal when it is desired to transmit a message between the telephone sets, said tone signal being transmitted prior to said message by a predetermined time increment;

4. The system of claim 1 wherein, the radio frequency generator means includes a radio frequency oscillator for generating a carrier frequency of f1 when the telephone set is in a transmit mode and a carrier frequency of f2 when the telephone set is in a receive mode.

5. The system of claim 4 wherein, f1 is approximately 360 kHz; and f2 is approximately 420 kHz.

6. The system of claim 1 further including, a power source means for providing electrical power for the system.

7. The system of claim 6 wherein, the power source is a direct current battery.

8. The system of claim 1 further including, an electrical indicator at each of the telephone sets for indicating operating conditions of the intercom system;

a relaxation oscillator circuit connected to the electrical indicator for providing a plurality of different signals to the indicator, said signals being dependent upon the mode of operation of the system.

9. The system of claim 1 further including, a tone oscillator at each of said telephone sets for generating a tone signal responsive to the system being placed in the transmit mode; each of said telephone sets being responsive to said tone signal and having means for waking the system and preparing to receive a page message.

10. The system of claim 1 wherein, the radio frequency generator means includes a bandpass filter means for passing a signal of a frequency equal to the difference between a transmit frequency and a receive frequency, said transmit and said receive frequency each being of a value less than the radio broadcast frequency band.

11. The system of claim 1 wherein, said sensing means triggers a latching means which enables receive and transmit audio signals whenever the volume level exceeds said ambient background noise level after said predetermined time period and receipt of said paging signal.

12. The system of claim 11 wherein, said volume level exceeds said ambient background noise level by a predetermined amount.

* * * * *